US011559954B2

(12) United States Patent
Knebel et al.

(10) Patent No.: US 11,559,954 B2
(45) Date of Patent: Jan. 24, 2023

(54) MULTI-CHAMBER CONFORMABLE BLADDER FOR COMPOSITE PART TOOLING

(71) Applicant: The Boeing Company, Chicago, IL (US)

(72) Inventors: Adam David Knebel, Highland, IL (US); Justin Joseph Schell, Saint Peters, MO (US); Mark A. Monzyk, Wentzville, MO (US); Randall D. Wilkerson, O'Fallon, MO (US); Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 16/744,556

(22) Filed: Jan. 16, 2020

(65) Prior Publication Data

US 2021/0221073 A1 Jul. 22, 2021

(51) Int. Cl.
*B29C 70/44* (2006.01)
*B32B 37/10* (2006.01)
(Continued)

(52) U.S. Cl.
CPC .......... *B29C 70/446* (2013.01); *B29C 33/505* (2013.01); *B29C 66/81455* (2013.01); *B32B 37/10* (2013.01)

(58) Field of Classification Search
CPC .. B29C 70/446; B29C 66/81455; B32B 37/10
See application file for complete search history.

(56) References Cited

U.S. PATENT DOCUMENTS 6,298,896 B1 10/2001 Sherrill et al.
7,114,751 B2 10/2006 Reynolds, Jr.
(Continued)

FOREIGN PATENT DOCUMENTS

EP 2623302 A1 8/2013
EP 3042747 A1 7/2016
(Continued)

OTHER PUBLICATIONS

Extended European Search Report dated Jun. 2, 2021 for European Patent Application No. 21150712.4, 7 pages.

*Primary Examiner* — Christopher T Schatz
(74) *Attorney, Agent, or Firm* — Sage Patent Group

(57) ABSTRACT

A tool for forming a part includes a first tool portion including a first tool surface. The tool further includes a second tool portion comprising a second tool surface facing the first tool surface, wherein the first tool surface and the second tool surface define a tool chamber for forming the part. The tool further includes a bladder subassembly disposed in the tool chamber between the first tool surface and the second tool surface. The bladder subassembly includes a plurality of inner bladders disposed within tool chamber, wherein each inner bladder of the plurality of inner bladders includes an inner bladder chamber that is independently inflatable to selectively apply pressure to the part. The bladder subassembly further includes a bladder cover disposed over the plurality of inner bladders within the tool chamber to provide a barrier between the plurality of inner bladders and the part.

20 Claims, 12 Drawing Sheets

(51) Int. Cl.

| | |
|---|---|
| ***B29C 33/50*** | (2006.01) |
| ***B29C 65/00*** | (2006.01) |

(56) References Cited

U.S. PATENT DOCUMENTS

| | | | | |
|---|---|---|---|---|
| 7,622,066 | B2 | 11/2009 | Brustad et al. | |
| 7,824,171 | B2 | 11/2010 | Hanson et al. | |
| 8,936,695 | B2 | 1/2015 | Rotter et al. | |
| 8,974,212 | B2 | 3/2015 | Cundiff et al. | |
| 9,296,187 | B2 * | 3/2016 | Pham | B29C 33/505 |
| 2010/0009124 | A1 | 1/2010 | Robins et al. | |
| 2014/0096903 | A1 * | 4/2014 | Stephens | B29C 70/446<br>156/382 |
| 2021/0060873 | A1 | 3/2021 | Matlack et al. | |

FOREIGN PATENT DOCUMENTS

| | | | |
|---|---|---|---|
| EP | 3103626 | A1 | 12/2016 |
| EP | 3378634 | A1 | 9/2018 |

* cited by examiner

MULTI-CHAMBER CONFORMABLE BLADDER FOR COMPOSITE PART TOOLING

FIELD

Embodiments described herein relate to a bladder, and more particularly to a multi-chamber conformable bladder for composite part tooling, and related devices, systems, and methods.

BACKGROUND

In the fabrication of aerospace level quality composite parts, conventional molding processes allow rapid processing in forming the parts, but have limitations that make producing complex composite parts more difficult. For example, thermoplastic composites offer a wide range of cycle time and cost benefits when used in appropriate applications, but may not be easily producible using traditional methods. For example, compound mold line shapes of thermoplastic composite often cannot be produced by conventional clamshell type molds where the mold parts move in substantially vertical tool opening and tool closing directions. Current tooling systems typically do not provide sufficient consolidation pressure for complex thermoplastic composite mold line shapes. In addition, the effects of thermal expansion in the molding of thermoplastic composite parts creates difficulty in achieving aerospace level quality using traditional tooling. Thus, there is a need for improved devices, systems, and methods for composite part tooling for these and other applications.

SUMMARY

In accordance with an embodiment, a tool for forming a part is disclosed. The tool includes a first tool portion comprising a first tool surface. The tool further includes a second tool portion comprising a second tool surface facing the first tool surface, wherein the first tool surface and the second tool surface define a tool chamber for forming the part. The tool further includes a bladder subassembly disposed in the tool chamber between the first tool surface and the second tool surface. The bladder subassembly includes a plurality of inner bladders disposed within tool chamber, wherein each inner bladder of the plurality of inner bladders comprises an inner bladder chamber that is independently inflatable to selectively apply pressure to the part within the tool chamber. The bladder subassembly further includes a bladder cover disposed over the plurality of inner bladders within the tool chamber to provide a barrier between the plurality of inner bladders and the part.

In accordance with an embodiment and any of the preceding embodiments, each of the plurality of inner bladders comprises a substantially linear tube, and wherein the plurality of inner bladders are arranged in an array within the tool chamber.

In accordance with an embodiment and any of the preceding embodiments, the bladder cover comprises a flexible sheet, and each inner bladder comprises a flexible tube defining the inner bladder chamber.

In accordance with an embodiment and any of the preceding embodiments, the tool further includes a first endcap disposed at a first end of the tool, the first endcap comprising a first endcap portion and a second endcap portion. The first endcap portion and the second endcap portion clamp a first end of the flexible sheet therebetween. The first endcap portion and the second endcap portion further clamp a first end of the flexible tube of each inner bladder therebetween to isolate the inner bladder chamber of the inner bladder within the tool chamber.

In accordance with an embodiment and any of the preceding embodiments, the tool further includes a plurality of inlet tubes, each inlet tube of the plurality of inlet tubes extending from the inner bladder chamber of a respective inner bladder to an exterior of the tool. The first endcap portion and the second endcap portion clamp the inlet tube for each inner bladder therebetween.

In accordance with an embodiment and any of the preceding embodiments, the tool further comprises a plurality of retaining elements coupled to the first endcap, wherein each retaining element of the plurality of retaining elements retains a respective inlet tube within the respective inner bladder to inhibit movement of the inlet tube with respect to the inner bladder.

In accordance with an embodiment and any of the preceding embodiments, the bladder further comprises an outer bladder enclosing the plurality of inner bladders, wherein the outer bladder comprises the bladder cover.

In accordance with an embodiment and any of the preceding embodiments, the bladder cover and the inner bladders comprise a flexible material, and the inner bladders are unitary with the bladder cover.

In accordance with an embodiment and any of the preceding embodiments, a first inner bladder of the plurality of inner bladders and a second inner bladder of the plurality of inner bladders comprise a shared wall therebetween.

In accordance with an embodiment and any of the preceding embodiments, a bladder for a tool is disclosed. The bladder includes a plurality of inner bladders disposed in an array within a tool chamber of the tool. Each inner bladder of the plurality of inner bladders comprises an inner bladder chamber that is independently inflatable to selectively apply pressure to a part within a tool chamber of the tool. The bladder further includes a bladder cover covering the plurality of inner bladders to provide a barrier between the plurality of inner bladders and the part within the tool chamber.

In accordance with an embodiment and any of the preceding embodiments, each of the plurality of inner bladders comprises a substantially linear tube, and wherein the plurality of inner bladders are arranged in an array within the tool chamber.

In accordance with an embodiment and any of the preceding embodiments, the bladder cover comprises a flexible sheet, and each inner bladder comprises a flexible tube defining the inner bladder chamber.

In accordance with an embodiment and any of the preceding embodiments, the bladder further includes a plurality of inlet tubes, each inlet tube of the plurality of inlet tubes extending from the inner bladder chamber of a respective inner bladder to the exterior of the inner bladder chamber.

In accordance with an embodiment and any of the preceding embodiments, the bladder cover and the inner bladders comprise a flexible material, and the inner bladders are unitary with the bladder cover.

In accordance with an embodiment and any of the preceding embodiments, a method is disclosed. The method includes disposing a workpiece in a tool chamber of a tool. The tool includes a first tool portion comprising a first tool surface. The tool further includes a second tool portion comprising a second tool surface facing the first tool surface, wherein the first tool surface and the second tool surface define the tool chamber. The method further includes disposing a bladder subassembly in the tool chamber between the first tool surface and the second tool surface, including disposing a plurality of inner bladders within tool chamber, wherein each inner bladder of the plurality of inner bladders comprises an inner bladder chamber, and disposing a bladder cover over the plurality of inner bladders within the tool chamber to provide a barrier between the plurality of inner bladders and the workpiece. The method further includes independently inflating the plurality of inner bladders to selectively apply pressure to the workpiece within the tool chamber to form the part.

In accordance with an embodiment and any of the preceding embodiments, the method further includes, before inflating the plurality of inner bladders, securing the first tool portion with respect to the second tool portion to form an airtight seal around the tool chamber.

In accordance with an embodiment and any of the preceding embodiments, inflating the plurality of inner bladders further comprises: inflating the plurality of inner bladders with a gas.

In accordance with an embodiment and any of the preceding embodiments, inflating the plurality of inner bladders further comprises: inflating the plurality of inner bladders with a liquid.

In accordance with an embodiment and any of the preceding embodiments, inflating the plurality of inner bladders further includes inflating at least two of the plurality of inner bladders to different pressures.

In accordance with an embodiment and any of the preceding embodiments, inflating the plurality of inner bladders further includes inflating at least two of the plurality of inner bladders at different times.

DETAILED DESCRIPTION

Figure 1A:
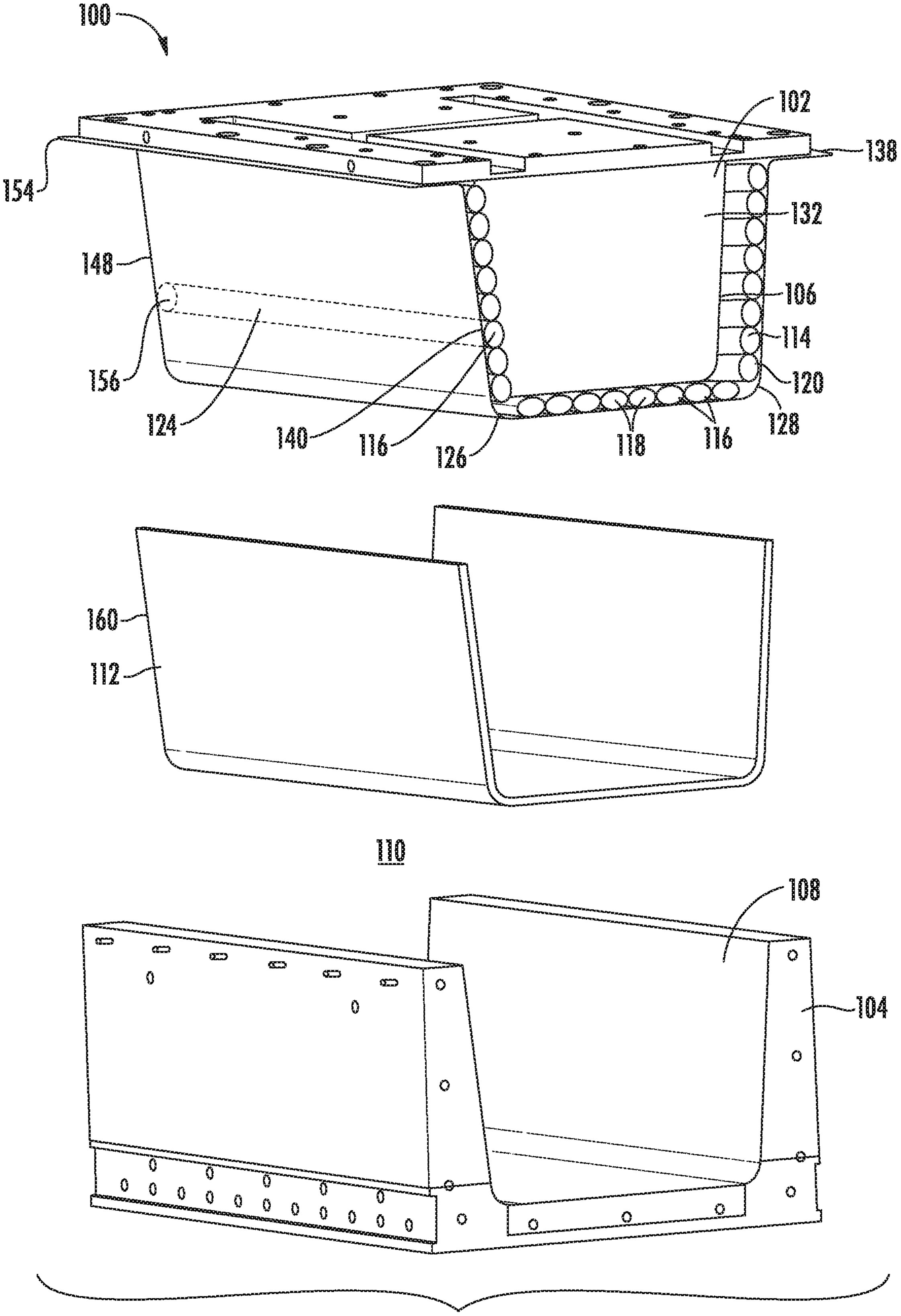
FIGS. 1A-1D are perspective views of a tool for forming a part using a bladder subassembly, illustrating assembly of the tool around a workpiece, according to an embodiment.

Embodiments described herein relate to a bladder, and more particularly to a multi-chamber conformable bladder for thermoplastic tooling, and related devices, systems, and methods.

In this regard, FIGS. 1A-1D are perspective views of a tool 100 for forming a part 112 using a bladder subassembly 114, illustrating assembly of the tool 100 around a workpiece 160, according to an embodiment. The tool 100 forms the part 114 from the workpiece 160. The tool 100 includes a first tool portion 102 having a first tool surface 106, and a second tool portion 104 having a second tool surface 108 facing the first tool surface 106. The first tool surface 106 and the second tool surface 108 define a tool chamber 110 for forming the part 112. The tool 100 includes a bladder subassembly 114 disposed in the tool chamber 110 between the first tool surface 106 and the second tool surface 108.

The bladder subassembly 114 includes a plurality of inner bladders 116 disposed within the tool chamber 110 and a bladder cover 120 disposed over the plurality of inner bladders 116 within the tool chamber 110, to provide a barrier between the plurality of inner bladders 116 and the thermoplastic part 112. Each inner bladder 116 includes an inner bladder chamber 118 that is independently inflatable to selectively apply pressure to the thermoplastic part 112 within the tool chamber 110.

In this example, the bladder cover 120 is a flexible sheet 128 that covers the plurality of inner bladders 116. Each inner bladder 116 includes a substantially linear flexible tube 124 defining the respective inner bladder chamber 118, with the inner bladders 116 arranged in an array 126 within the tool chamber 110.

Figure 1B:
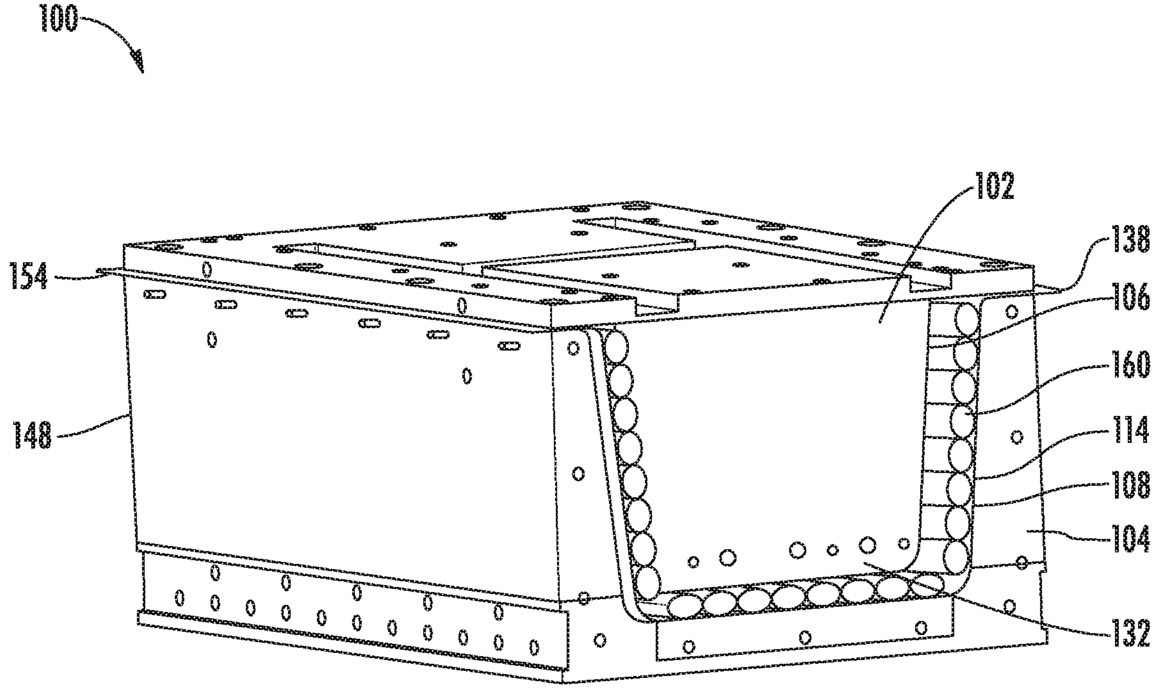

As shown by FIG. 1A, the bladder subassembly 114 is disposed on the first tool surface 106 of the first tool portion 102, and a workpiece 160 that will form the part 112 is disposed between the first tool portion 102 and the second tool portion 104. As shown by FIG. 1B, the bladder subassembly 114 is substantially deflated and does not apply substantial pressure against the workpiece 160 during assembly.

Figure 1C:
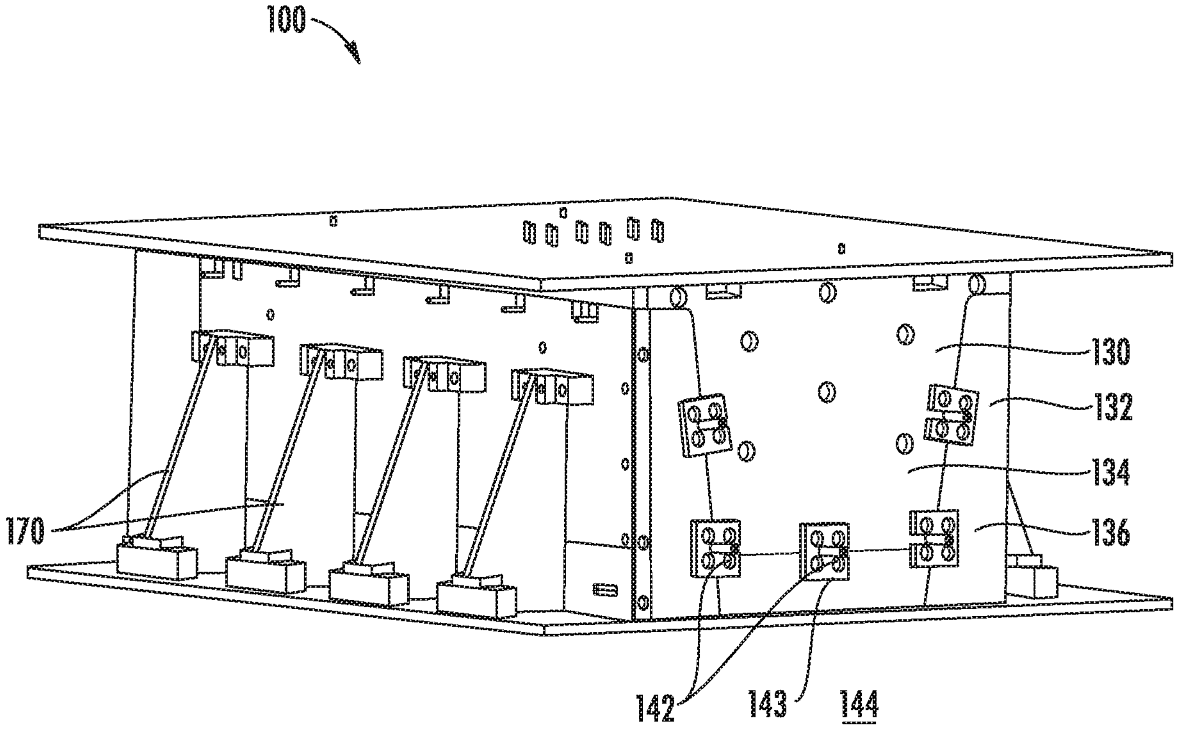

Referring now to FIG. 1C, in this embodiment, a first endcap 130 is installed at a first end 132 (see FIG. 1A) of the tool 100. As shown by FIGS. 2B and 2C below, a second endcap 146 is also installed at a second end 148 of the tool 100 opposite the first end 132. The first endcap 130 includes a first endcap portion 134 and a second endcap portion 136 that clamp a first end 138 (see FIGS. 2B and 2C) of the flexible sheet 128 of the bladder cover 120 and first ends 140 (see FIGS. 2B and 2C) of the flexible tubes 124 of the inner bladders 116 therebetween. The second endcap 146 in this embodiment includes a third endcap portion 150 and a fourth endcap portion 152 that clamp a second end 154 (see FIG. 1A) of the flexible sheet 128 of the bladder cover 120 and second ends 156 (see FIG. 1A) of the flexible tubes 124 of the inner bladders 116 therebetween. In this manner, the first endcap 130 and the second endcap 146 isolate the inner bladder chambers 118 within the tool chamber 110.

Figure 1D:
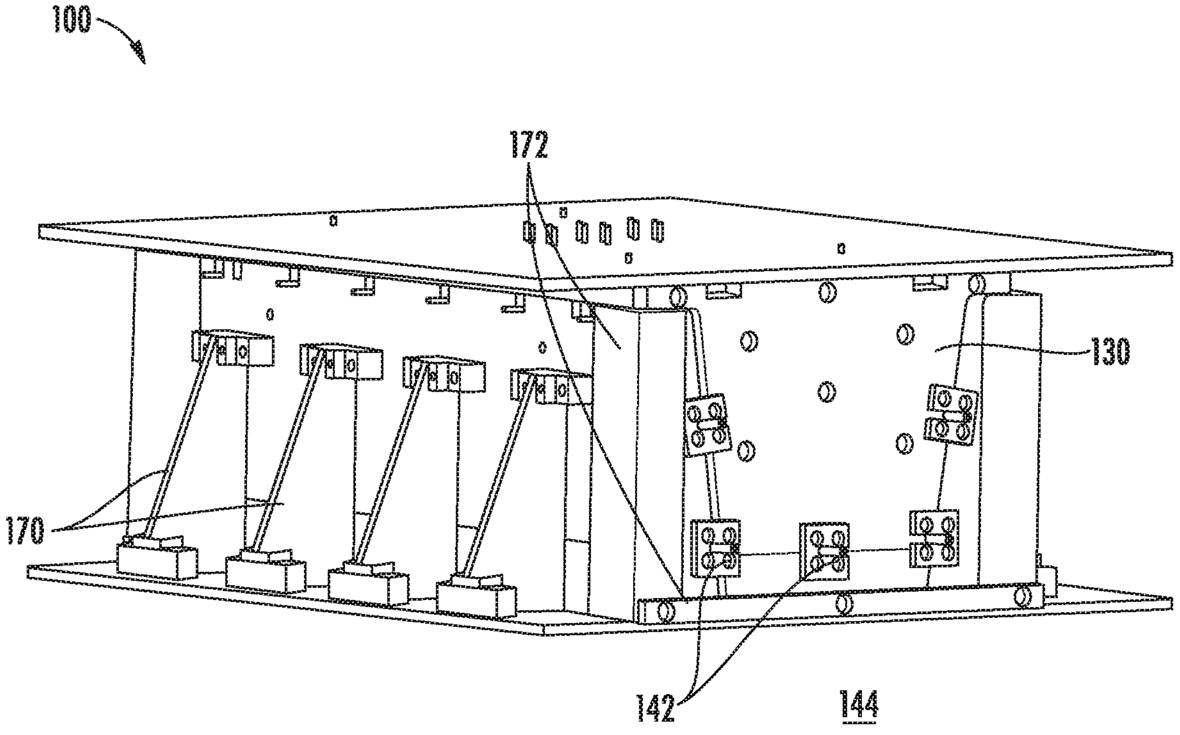

In this embodiment, a plurality of inlet tubes 142 extend from respective inner bladder chambers 118 of the inner bladders 116 to an exterior 144 of the tool 100. The plurality of inlet tubes 142 are clamped between the first endcap portion 134 and the second endcap portion 136 of the first endcap 130, and permit each inner bladder 116 to be independently inflated to apply pressure to the thermoplastic workpiece 160 to form the thermoplastic part 112. To further secure the tool 100, and to prevent movement of the tool portions 102, 104, endcaps 130, 146, or other components during formation of the part 112, additional bracing components 170 and support components 172 are attached around the tool 100, as shown by FIGS. 1C and 1D. In this embodiment, the third endcap portion 150 and the fourth endcap portion 152 of the second endcap 146 completely seal the second ends 154, 156 of the flexible sheet 128 and flexible tubes 124 of the inner bladders 116, but it should be understood that, in another embodiment, additional inlet tubes may be disposed in the second endcap 146 to independently inflate the inner bladders 116 from both ends of the tool 100.

Figure 2A:
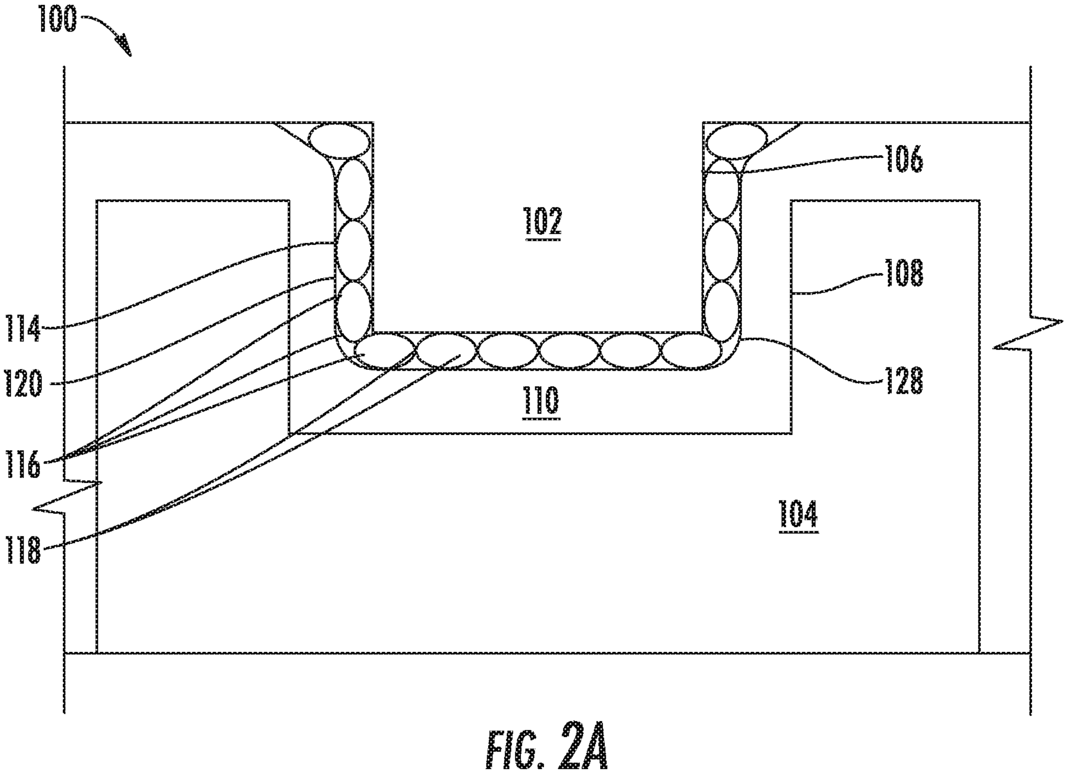
FIGS. 2A-2C are cross-sectional views of the tool of FIGS. 1A-1D illustrating the components of the bladder subassembly and assembly of the tool around a workpiece.
Figure 2B:
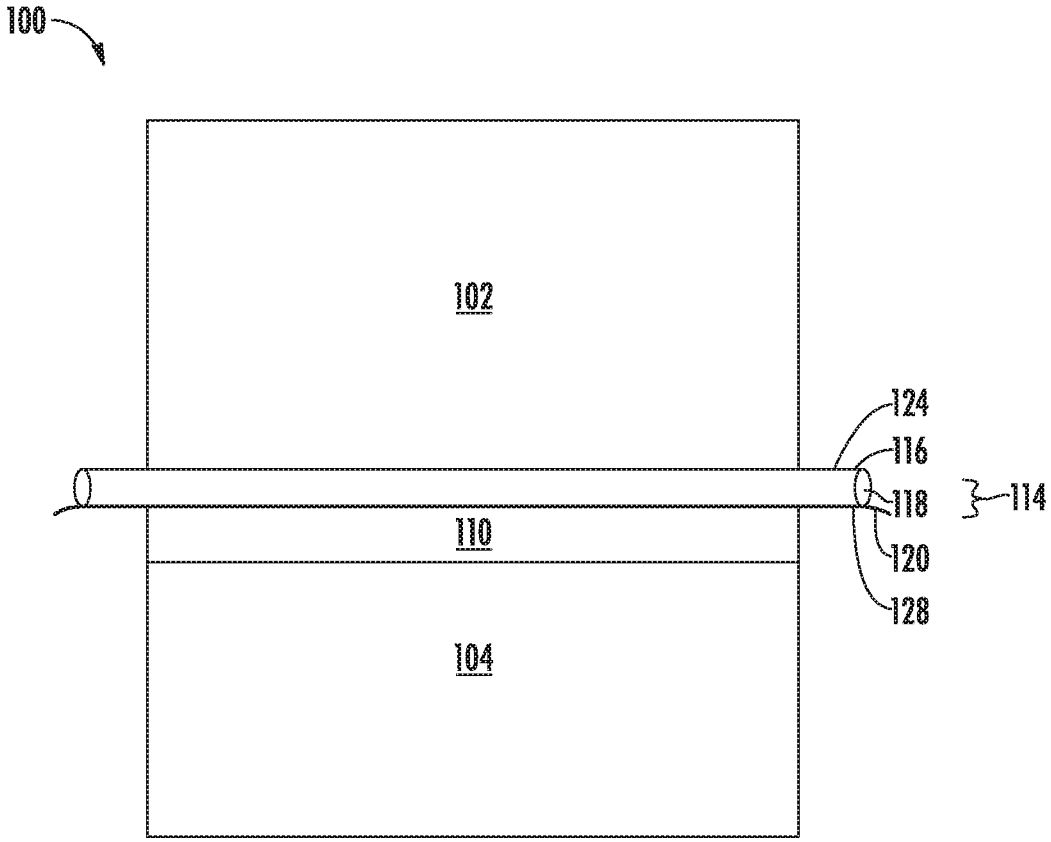
Figure 2C:
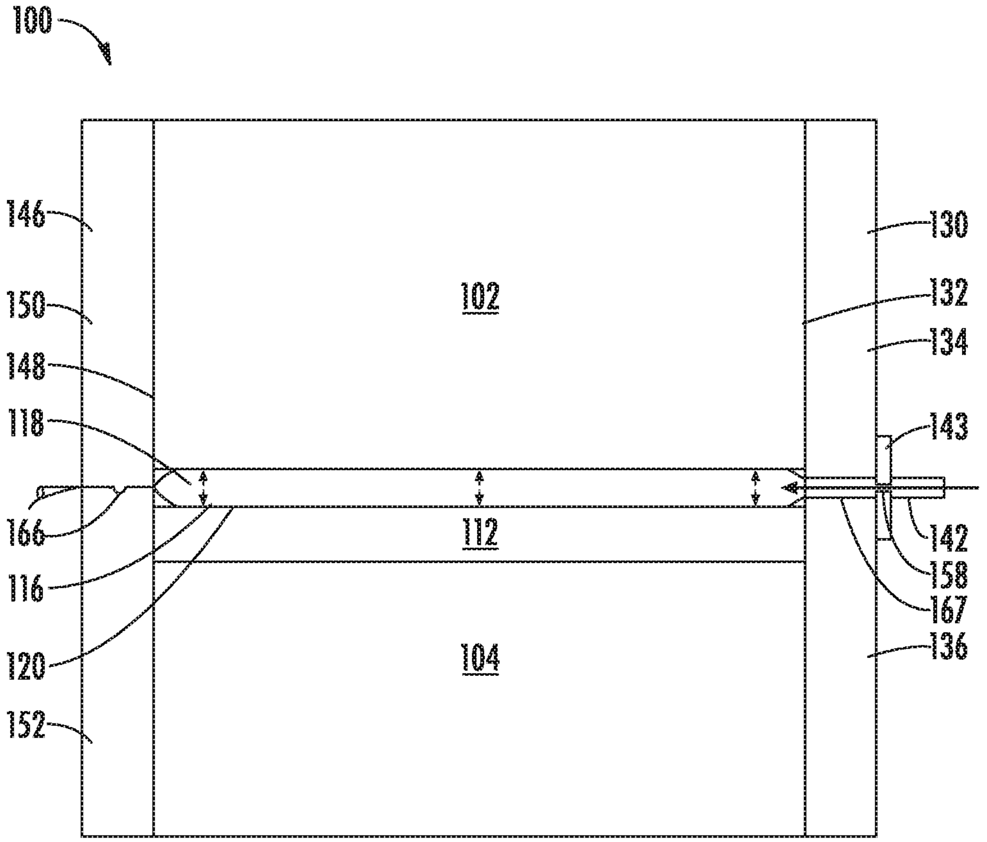

Referring now to FIGS. 2A-2C, cross-sectional views of the tool 100 of FIGS. 1A-1D illustrating the components of the bladder subassembly 114 are illustrated. Referring now to FIG. 2A, a lateral cross section of the tool 100 illustrates the inner bladders 116 arranged in an array 126 along the first tool surface 106 of the first tool portion 102. The flexible sheet 128 of the bladder cover 120 provides a barrier between the inner bladders 116 and the part (not shown) within the tool chamber 110. One advantage of using the bladder cover 120 between the inner bladders 116 and the part is that the bladder cover 120 helps to keep the surface of the part smooth during inflation of the inner bladders 116, and reduces the appearance of any seams that may otherwise form on the part at the junctions between the inner bladders 116. In this example, the bladder cover 120 is less flexible than the inner bladders 116 to reduce the appearance of wrinkles or seams (e.g., mark-off) between the bladders, but it should be understood that the flexibility of the inner bladders 116 and/or bladder cover 120 may be customized based on the materials being used and desired properties of the finished part 112.

Referring now to FIGS. 2B and 2C, longitudinal cross sectional views of the tool 100 illustrate assembly of tool 100 around a workpiece 160 to form the part 114. As discussed above, a first endcap portion 134 and a second endcap portion 136 of the first endcap 130 clamp a first end 138 of the flexible sheet 128 of the bladder cover 120 and first ends 140 of the flexible tubes 124 of the inner bladders 116 therebetween to isolate the inner bladder chambers 118 of the inner bladders 116 within the tool chamber 110. As described in additional detail below with respect to FIGS. 5A-5D, the first endcap 130 also retains a plurality of inlet tubes 142 therebetween to provide for selective inflation of each individual inner bladder 116. It should be further understood that, in this embodiment, each individual inner bladder 116 has a corresponding inlet tube 142, but the exact number of inlet tubes 142 and/or inner bladders 116 illustrated in the various figures varies for simplicity of presentation. In another embodiment, multiple inner bladders 116 may be selectively inflated by one or more common inlet tubes 142, as desired.

The second endcap 146 in this embodiment includes a third endcap portion 150 and a fourth endcap portion 152 that clamp a second end 154 of the flexible sheet 128 of the bladder cover 120 and second ends 156 of the flexible tubes 124 of the inner bladders 116 therebetween. In this manner, the first endcap 130 and the second endcap 146 isolate the inner bladder chambers 118 within the tool chamber 110.

One advantage of this embodiment is that variable pressure can be selectively applied across different regions of a composite material during the tooling process. For example, during the debulk and consolidation cycles for tooling a thermoplastic part, the bladder cover 120 provides a continuous contact surface at the material interface between the bladder subassembly 114 and the part 112, while allowing for applying different pressures at different times to different zones of the part 112, without the need for more complex tooling arrangements. This aids in preventing inconsistencies and defects in the composite material of the part 112 while also reducing wrinkles and mold lines in the finished part 112.

This embodiment also permits targeted and dynamic adjustments to pressures applied to different portions of the part 112 at different times. For example, increased pressure may be applied to a corner of the part 112 during a crystallization phase for the part 112. Different processes can be applied to a plurality of test parts 112 using a trial and error process to optimize the pressure application process for the part 112, with the areas of the part 112 that receive more pressure varying based on the shape and complexity of the part 112. For example, pressure may be applied at a center of the part 112 first, with successive adjacent inner bladders 116 increasing sequentially to push wrinkles to the edge of the part 112.

Figure 3:
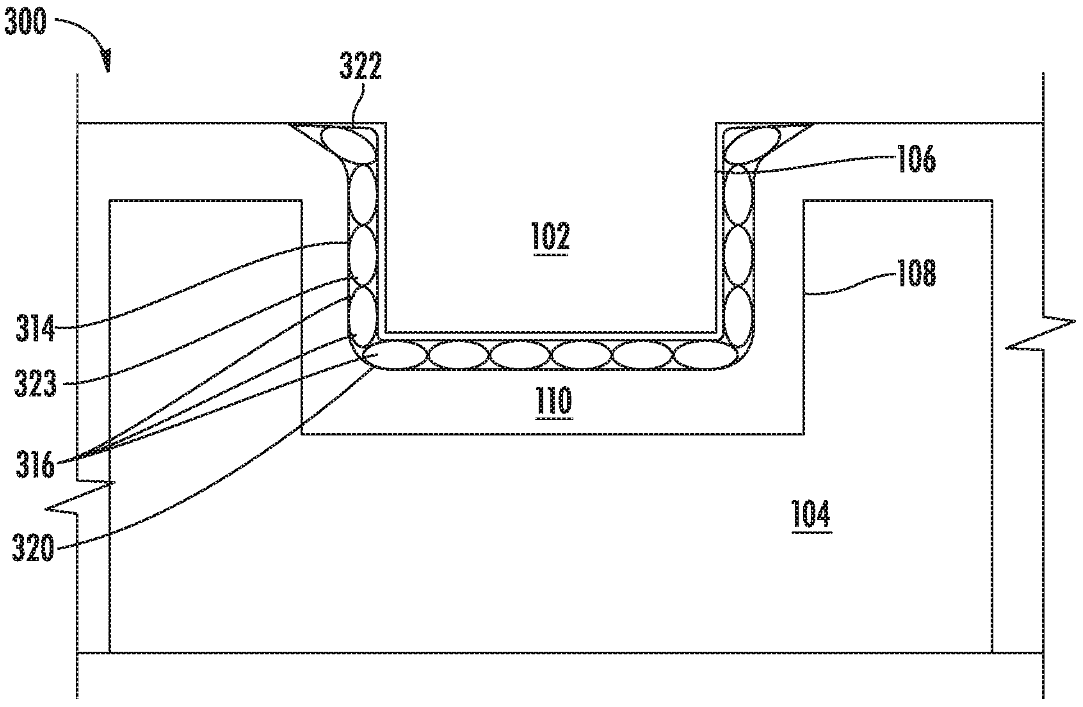
FIG. 3 is a cross-sectional view of a tool having an alternative bladder subassembly including an outer bladder enclosing the plurality of inner bladders, according to another embodiment.

FIG. 3 is a cross-sectional view of a tool 300 having an alternative bladder subassembly 314 including a flexible outer bladder 322 enclosing the plurality of inner bladders 316, according to another embodiment. In this example, the first tool portion 102 having the first tool surface 106 and the second tool portion 104 having the second tool surface forming the tool chamber are the same as the embodiment of FIGS. 1A-2 above. In this embodiment, however, the bladder cover 320 is part of the outer bladder 322 that encloses the inner bladders 316 within an outer bladder chamber 323. One advantage of this embodiment is that the entire bladder subassembly 314 may be more easily installed, removed, or replaced within the tool chamber 110 without removing the inner bladders 316 individually. In this embodiment, the outer bladder 322 is independently inflatable.

Figure 4:
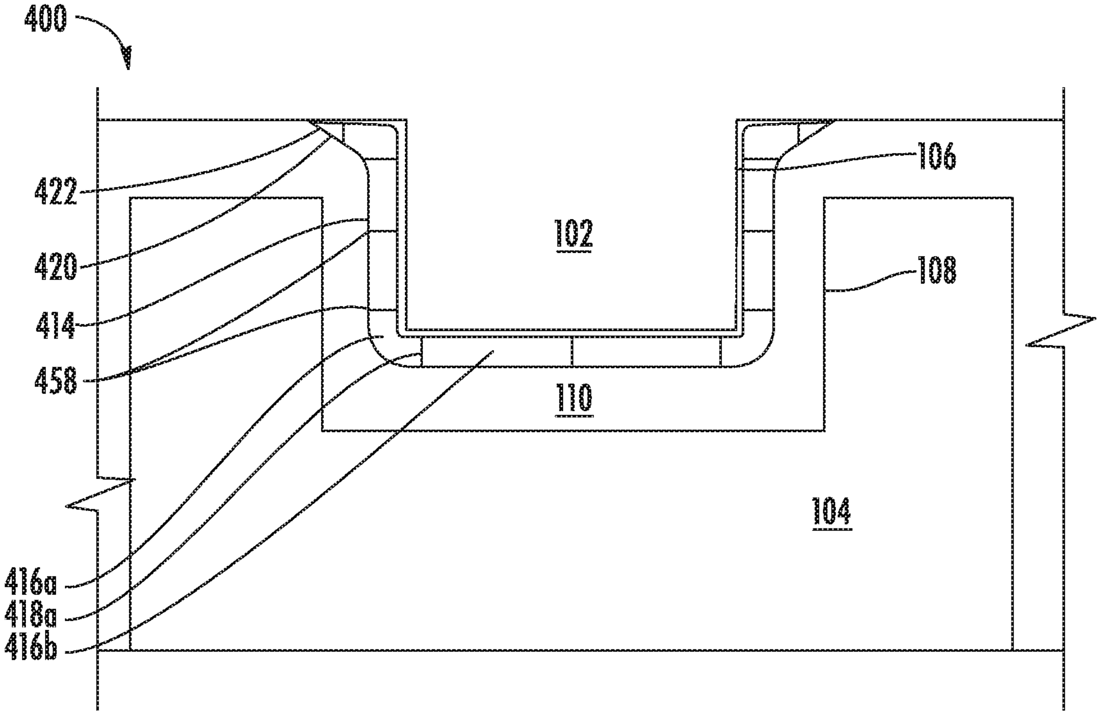
FIG. 4 is a cross-sectional view of a tool having an alternative bladder subassembly including an outer bladder that is unitary with the plurality of inner bladders, according to another embodiment.

FIG. 4 is a cross-sectional view of a tool 400 having another alternative bladder assembly 414 including an outer bladder 422 that is unitary with the plurality of inner bladders 416, according to another embodiment. In this example, the first tool portion 102 having the first tool surface 106 and the second tool portion 104 having the second tool surface forming the tool chamber are the same as the embodiment of FIGS. 1A-2 above. In this embodiment, however, the bladder cover 420 is part of a flexible outer bladder 422 that includes a plurality of unitary walls 458 therein. The unitary walls 458 and outer bladder 422 form the plurality of inner bladders 416, with each pair of adjacent inner bladders 416 (see, e.g., inner bladders 416*a* and 416*b*) including a shared wall 458*a* therebetween. One advantage of this embodiment is that the bladder subassembly 414 can be formed as a unitary component, to reduce complexity of installation of the bladder subassembly 414 and to prevent individual inner bladders 416 from moving or becoming misaligned with respect to each other.

Figure 5A:
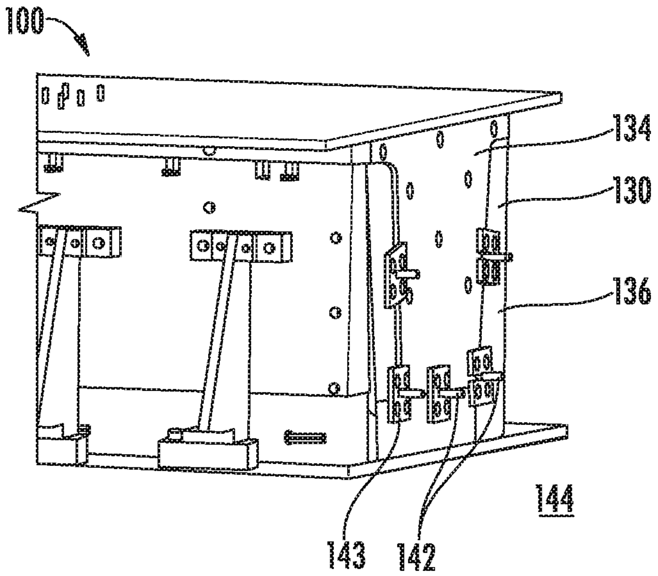
FIGS. 5A-5D are detailed perspective view of the first endcap and inlet tubes of FIGS. 1A-1D, illustrating components and detailed thereof.
Figure 5B:
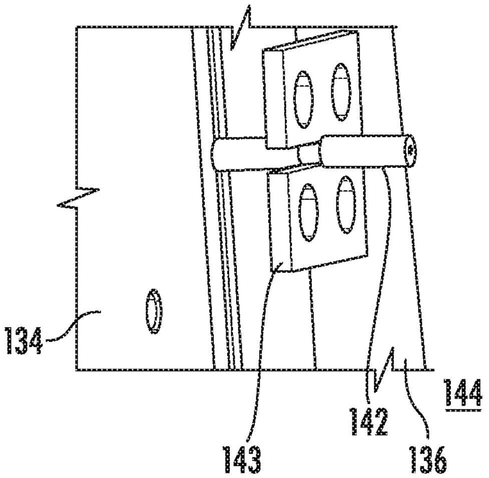
Figure 5C:
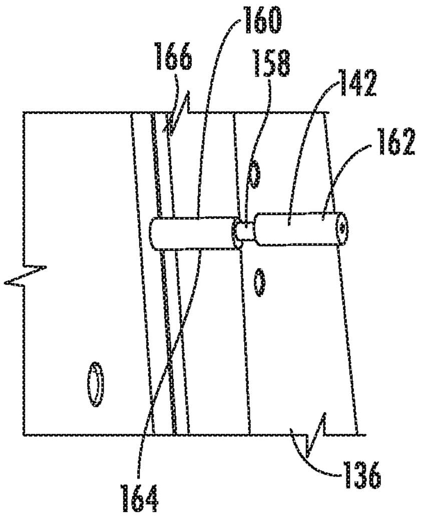
Figure 5D:
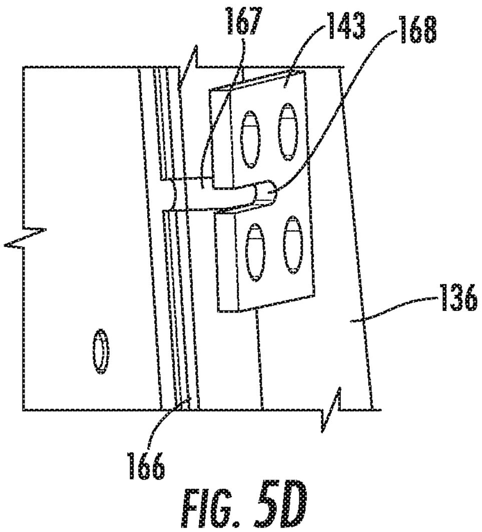

As discussed above with respect to FIGS. 1A-1D, a plurality of inlet tubes 142 extend from respective inner bladder chambers 118 of the inner bladders 116 to an exterior of the tool 100. In this regard, FIGS. 5A-5D are detailed perspective view of the first endcap 130 and inlet tubes 142 of FIGS. 1A-1D, illustrating components and detailed thereof. As shown by FIG. 5A, each inlet tube 142 is clamped between the first endcap portion 134 and second endcap portion 136 during assembly of the tool 100 to position a portion of each inlet tube 142 within a respective inner bladder 116 (see FIG. 1A-1D). As shown by FIGS. 5B-5D, each inlet tube 142 is secured to the endcap 130 by a retaining element 143 (which is a C-clip in this embodiment), which extends around the inlet tube 142 to engage an inner surface 168 (see FIG. 5D) of the retaining element 143 with a narrow portion 158 (see FIG. 5C) of the inlet tube 142, to inhibit movement of the retaining element 143 with respect to the respective inner bladder 116. This arrangement retains a first end 162 of the inlet tube 142 at the exterior 144 of the tool 100 and a second end 164 of the inlet tube 142 within the respective inner bladder 116, and prevents the inlet tube 142 from being ejected from the inner bladder 116 during inflation due to the higher pressure within the inner bladder 116. As shown by FIGS. 5C and 5D as well, the second endcap portion 136 includes a sealing ridge feature 166 and an inlet tube groove 167 that engages complementary features (not shown) of the first endcap portion 134 to more securely retain the inlet tubes 142, inner bladders 116 and bladder cover 120 therebetween.

Figure 6:
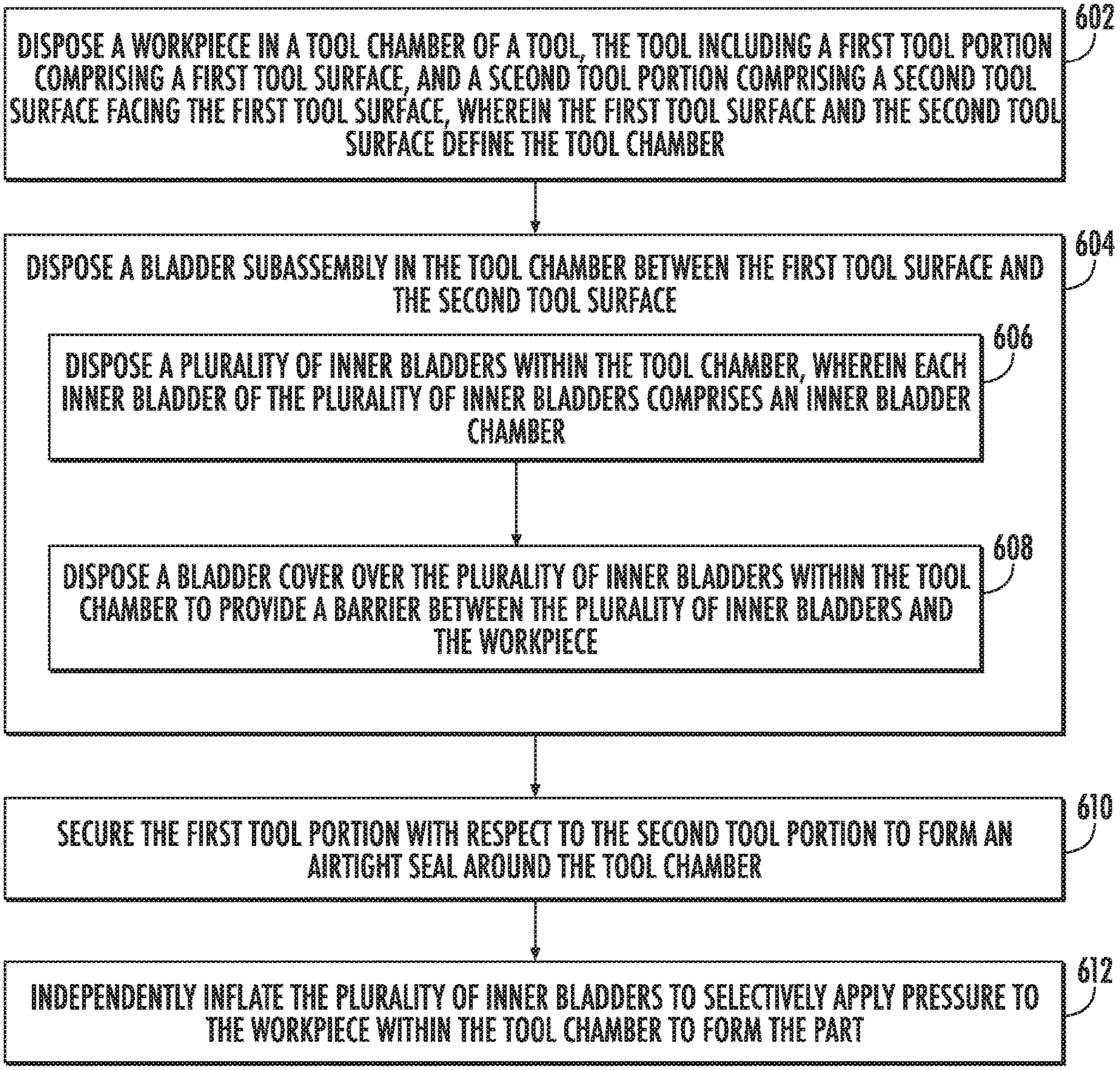
FIG. 6 is a flowchart diagram of a method of forming a part using the tool of FIGS. 1A-1D, according to an embodiment.

FIG. 6 is a flowchart diagram of a method 600 of forming a part using the tool of FIGS. 1A-1D, according to an embodiment. The method 600 includes disposing a workpiece 160 in a tool chamber 110 of a tool 100 (Block 602). The tool includes a first tool portion 102 comprising a first tool surface 106, and a second tool portion 104 comprising a second tool surface 108 facing the first tool surface 106, wherein the first tool surface 106 and the second tool surface 108 define the tool chamber 110. The method 600 further includes disposing a bladder subassembly 114 in the tool chamber 110 between the first tool surface 106 and the second tool surface 108 (Block 604), including disposing a plurality of inner bladders 116 within tool chamber 110, each comprising an inner bladder chamber 118 (Block 606), and disposing a bladder cover 120 over the plurality of inner bladders 116 within the tool chamber 110 to provide a barrier between the plurality of inner bladders 116 and the workpiece 160 (Block 608). The method 600 further includes securing the first tool portion 102 with respect to the second tool portion 104 to form an airtight seal around the tool chamber 110 (Block 610). The method 600 further includes independently inflating the plurality of inner bladders 116 to selectively apply pressure to the workpiece 160 within the tool chamber 110 to form the part 112 (Block 612). In this embodiment, the inner bladders 116 are inflated with gas, as desired, based on the properties of the tool 100, workpiece 160, and bladder subassembly 114. In another embodiment, the plurality of inner bladders are inflated with liquid, as desired, based on the properties of the tool 100, workpiece 160, and bladder subassembly 114. In another embodiment, at least two of the plurality of inner bladders 116 are inflated to different pressures, to influence the final shape of the part 112. In another embodiment, at least two of the plurality of inner bladders 116 are inflated at different times, for example to cause a wave action against the workpiece 160 during part formation, which may aid in smoothing an exterior surface of the finished part 112.

As will be appreciated by one skilled in the art, aspects of the present disclosure may be illustrated and described herein in any of a number of patentable classes or context including any new and useful process, machine, manufacture, or composition of matter, or any new and useful improvement thereof.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and "comprising," when used in this specification, specify the presence of stated features, steps, operations, elements, or components, but do not preclude the presence or addition of one or more other features, steps, operations, elements, components, or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A tool for forming a part, the tool comprising:

a first tool portion comprising a first tool surface;

a second tool portion comprising a second tool surface facing the first tool surface, wherein the first tool surface and the second tool surface define a tool chamber for forming the part; and a bladder subassembly disposed in the tool chamber between the first tool surface and the second tool surface, the bladder subassembly comprising:

a plurality of inner bladders disposed within the tool chamber, wherein each inner bladder of the plurality of inner bladders comprises an inner bladder chamber that is independently inflatable to selectively apply pressure to the part within the tool chamber;

a bladder cover disposed over the plurality of inner bladders within the tool chamber to provide a barrier between the plurality of inner bladders and the part;

a first endcap disposed at a first end of the tool, the first endcap comprising a first endcap portion and a second endcap portion; and a plurality of inlet tubes, each inlet tube of the plurality of inlet tubes extending from the inner bladder chamber of a respective inner bladder to an exterior of the tool, wherein the first endcap portion and the second endcap portion clamp a first end of the bladder cover and the inlet tube for each inner bladder therebetween to isolate the inner bladder chamber of each inner bladder within the tool chamber.

2. The tool of claim 1, wherein each inner bladder of the plurality of inner bladders comprises a substantially linear tube, and wherein the plurality of inner bladders are arranged in an array within the tool chamber.

3. The tool of claim 1, wherein the bladder cover comprises a flexible sheet, and wherein each inner bladder comprises a flexible tube defining the inner bladder chamber.

4. The tool of claim 1, further comprising a plurality of retaining elements coupled to the first endcap, wherein each retaining element of the plurality of retaining elements retains a respective inlet tube within the respective inner bladder to inhibit movement of the inlet tube with respect to the inner bladder.

5. The tool of claim 1, further comprising an outer bladder enclosing the plurality of inner bladders within an outer bladder chamber, wherein the outer bladder comprises the bladder cover.

6. The tool of claim 1, wherein the bladder cover and the inner bladders comprise a flexible material, and wherein the inner bladders are unitary with the bladder cover.

7. The tool of claim 6, wherein a first inner bladder of the plurality of inner bladders and a second inner bladder of the plurality of inner bladders comprise a shared wall therebetween.

8. A tool comprising: a plurality of inner bladders disposed within a tool chamber of the tool, wherein each inner bladder of the plurality of inner bladders comprises an inner bladder chamber that is independently inflatable to selectively apply pressure to a part within the tool chamber of the tool; a plurality of inlet tubes, each inlet tube of the plurality of inlet tubes extending from the inner bladder chamber of a respective inner bladder to an exterior of the tool, each inlet tube of the plurality of inlet tubes configured to be clamped between a first endcap portion and a second endcap portion of an endcap disposed at a first end of the tool to isolate the inner bladder chamber of each inner bladder within the tool chamber; and a bladder cover covering the plurality of inner bladders to provide a barrier between the plurality of inner bladders and the part within the tool chamber.

9. The tool of claim 8, wherein each of the plurality of inner bladders comprises a substantially linear tube, and wherein the plurality of inner bladders are arranged in an array within the tool chamber.

10. The tool of claim 8, wherein the bladder cover comprises a flexible sheet, and wherein each inner bladder comprises a flexible tube defining the inner bladder chamber.

11. The tool of claim 8, wherein the bladder cover and the inner bladders comprise a flexible material, and wherein the inner bladders are unitary with the bladder cover.

12. The tool of claim 8, further comprising a plurality of retaining elements configured to engage each inlet tube of the plurality of inlet tubes to inhibit movement of the inlet tube.

13. The tool of claim 12, wherein each retaining element of the plurality of retaining elements comprises an inner surface and wherein each inlet tube of the plurality of inlet tubes comprises a narrow portion configured to engage the inner surface of the respective retaining element.

14. The tool of claim 12, wherein each retaining element of the plurality of retaining elements comprises a c-clip.

15. The tool of claim 12, further comprising an outer bladder enclosing the plurality of inner bladders within an outer bladder chamber, wherein the outer bladder comprises the bladder cover.

16. The tool of claim 8, wherein each inlet tube of the plurality of inlet tubes is configured to be clamped between a first inlet tube groove of the first endcap portion and a second inlet tube groove of the second endcap portion to securely retain the inlet tube therebetween.

17. The tool of claim 4, wherein each retaining element of the plurality of retaining elements comprises an inner surface and wherein each inlet tube of the plurality of inlet tubes comprises a narrow portion configured to engage the inner surface of the respective retaining element.

18. The tool of claim 4, wherein each retaining element of the plurality of retaining elements comprises a c-clip.

19. The tool of claim 1, wherein the first endcap portion comprises a sealing ridge feature; and wherein the second endcap portion comprises a complementary sealing feature to engage the sealing ridge feature of the first endcap portion.

20. The tool of claim 1, wherein the first endcap portion comprises a plurality of first inlet tube grooves to engage the plurality of inlet tubes; and wherein the second endcap portion comprises a plurality of second inlet tube grooves corresponding to the plurality of first inlet tube grooves to retain the plurality of inlet tubes.

* * * * *